US 6,503,019 B1

(12) United States Patent
Wang

(10) Patent No.: US 6,503,019 B1
(45) Date of Patent: Jan. 7, 2003

(54) REPLACEABLE TOP TUBE FOR BICYCLES

(76) Inventor: Chiu Kuei Wang, No. 101-19, Chung Cheng Li, Yuanli, Miaoli Hsien (TW)

( * ) Notice: Subject to any disclaimer, the term of this patent is extended or adjusted under 35 U.S.C. 154(b) by 0 days.

(21) Appl. No.: 09/883,305

(22) Filed: Jun. 19, 2001

(51) Int. Cl.$^7$ .................................................. F16B 7/10
(52) U.S. Cl. .................... 403/109.1; 403/321; 403/377; 403/379.6; 224/501; 224/510; 224/512
(58) Field of Search ............................ 403/109.1, 109.2, 403/109.5, 109.7, 109.8, 377, 379.1, 379.2, 379.6, 321, 322.1, 322.3, 324, 325; 24/600.4, 600.6; 248/200.1, 298.1, 229.12; 224/501, 510, 512

(56) References Cited

U.S. PATENT DOCUMENTS

| 2,644,504 | A | * | 7/1953 | Vick ......................... 403/109.3 |
| 3,039,634 | A | * | 6/1962 | Hobson et al. ............. 224/501 |
| 3,972,456 | A | * | 8/1976 | Saffold ........................ 224/402 |
| 3,988,813 | A | * | 11/1976 | Korcey, Jr. ................... 24/345 |
| 4,296,879 | A | * | 10/1981 | Jordening .................... 224/501 |
| 5,149,112 | A | * | 9/1992 | Nauman et al. ............ 280/278 |
| 5,169,042 | A | * | 12/1992 | Ching ......................... 224/497 |
| 5,217,149 | A | * | 6/1993 | Simonett ..................... 224/446 |
| 5,282,555 | A | * | 2/1994 | Muir et al. .................. 224/532 |
| D371,332 | S | * | 7/1996 | Chapple et al. ............ D12/114 |
| 5,558,349 | A | * | 9/1996 | Rubin ........................ 280/287 |
| 5,639,001 | A | * | 6/1997 | Brady ........................ 224/416 |
| 5,706,680 | A | * | 1/1998 | Wroble ........................... 211/4 |
| 5,711,397 | A | * | 1/1998 | Flora et al. .................... 182/3 |
| 5,779,386 | A | * | 7/1998 | Eichhorn ................. 403/109.3 |
| 5,865,044 | A | * | 2/1999 | Wu .............................. 70/209 |
| 6,131,712 | A | * | 10/2000 | Rhodenizer ................ 188/3 H |
| 6,193,432 | B1 | * | 2/2001 | Kampfert ................... 294/19.1 |
| 6,223,569 | B1 | * | 5/2001 | Wu .............................. 70/209 |

OTHER PUBLICATIONS

Graber 2000 catalog, p. 8, see #3037 bike beam.*
Bauer Vehicle Gear 2000 catalog, p. 7, see alternative bike adapter.*

* cited by examiner

Primary Examiner—Lynne H. Browne
Assistant Examiner—James M. Hewitt
(74) Attorney, Agent, or Firm—Rosenberg, Klein & Lee

(57) ABSTRACT

A replaceable top tube includes an outer tube and an inner tube retractably received therein. Two sleeves are respectively connected to the outer tube and the inner tube, and two locking plates are respectively connected to the two sleeves. Two hooks are respectively connected to the inner tube and the outer tube so that when the sleeves are pulled, the locking plates are moved away from the hooks so as to hook the seat post and the handlebar stem of a bicycle. Each of the two sleeves are positioned by a resilient member.

7 Claims, 8 Drawing Sheets

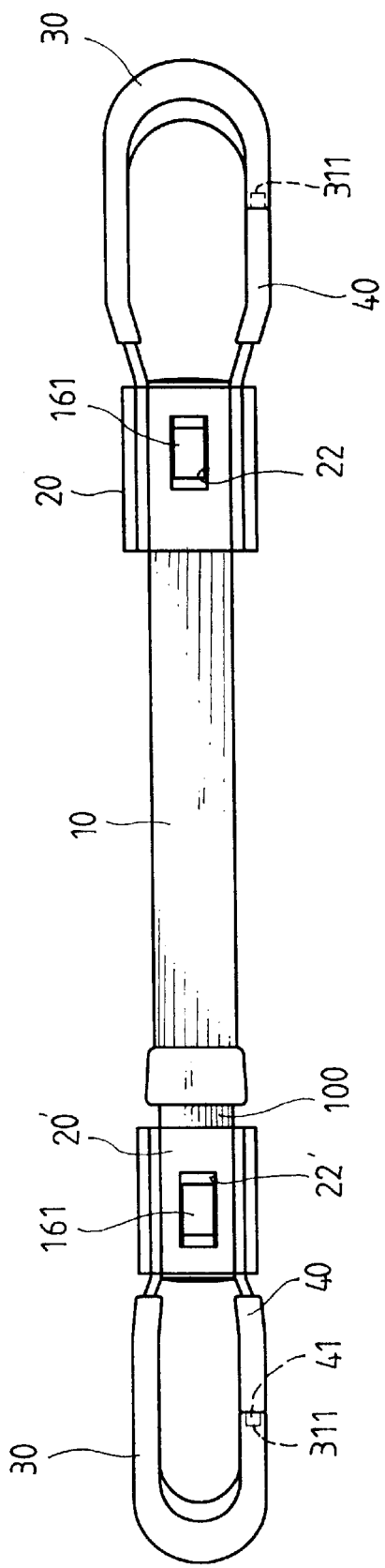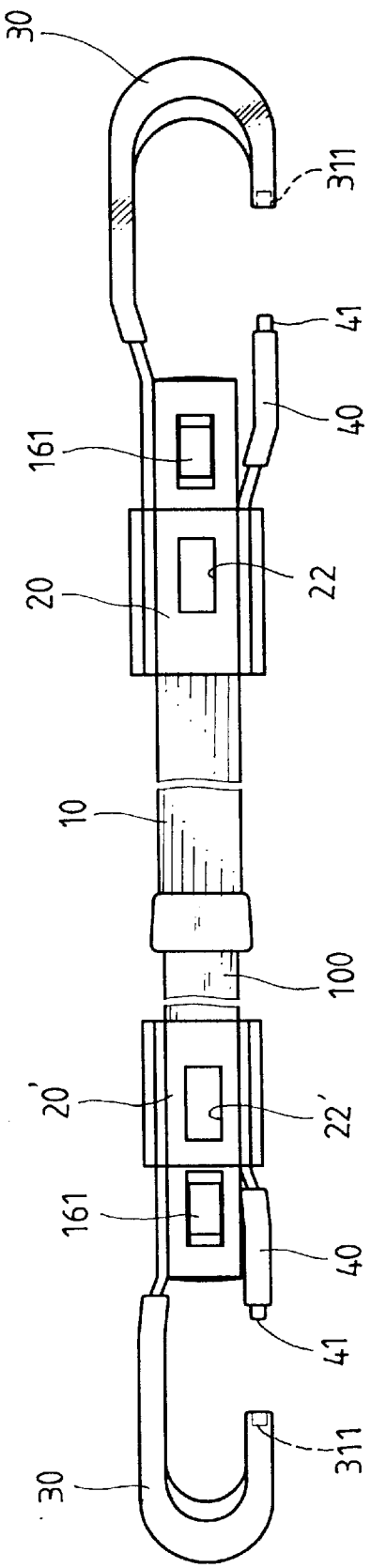
FIG.3A
FIG.3B

REPLACEABLE TOP TUBE FOR BICYCLES

FIELD OF THE INVENTION

The present invention relates to a replaceable top tube which has two engaging ends for respectively hooking to the seat post and the handlebar stem. Each of the engaging ends has a sleeve which is slid along the longitudinal tube of the replaceable top tube.

BACKGROUND OF THE INVENTION

Bicycles can be carried on outside of cars by using a bicycle carrier which has a clamp device to hold the top tube of the bicycle and two engaging devices are used to fix the bicycle. However, some bicycles have no top tube so that these bicycles cannot be carried on the bicycle carrier. In order to improve the shortcoming, a replaceable top tube is developed and shown in FIGS. 6 to 8. The replaceable top tube 70 includes a tube 71 with two hooks 73 connected to two ends of the tube 71, and two engaging members 70 are pivotally connected to the tube 71. Each of the engaging members 70 has a groove 723 defined in an inside thereof and a hole 722 is defined through the engaging member 70 and communicates with the groove 723. A protrusion 711 extends from the tube 71 so that when the engaging member 70 is pivoted toward the hook 73, the protrusion 711 is slid in the groove 723 and engaged with the hole 722. An inclined surface 721 on the engaging member 70 is matched with another inclined surface 731 defined in a distal end of the hook 73. The two hooks 73 may hook the seat post 60 or the seat tube and the handlebar stem of the bicycle.

The way that the engaging member 70 is pivoted relative to the tube 71 could be interfered by objects on the bicycle so that the user often takes a lot of time to adjust the position of the hooks 73 to successfully hook the seat post 60 and the handlebar stem. Besides, the area of the engaging members 70 is so small that it results a large pressure to the user's hand.

SUMMARY OF THE INVENTION

In accordance with one aspect of the present invention, there is provided a replaceable top tube which comprises an outer tube having a first aperture in a first end thereof and an inner tube has a first end thereof retractably received in a second end of the outer tube. A first sleeve is slidably mounted to the first end of the outer tube and has a first hole which is located in communication with the first aperture. A locking plate is fixedly connected to the first sleeve and a first hook is fixedly connected to the first end of the outer tube. The locking plate is engaged with the first hook when the first sleeve is not pulled. A resilient member is located in the first end of the outer tube and a pushing end extends through the first aperture and the first hole.

A second aperture is defined through a wall of a second end of the inner tube and a second sleeve is slidably mounted to the second end of the inner tube and has a second hole which is located in communication with the second aperture. Another locking plate is fixedly connected to the second sleeve and another hook is fixedly connected to the second end of the inner tube. The another locking plate is engaged with the another first hook when the second sleeve is not pulled.

The primary object of the present invention is to provide a replaceable top tube that has two sleeves which are pulled along the tube so that it is easy to use.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3A is a side view to show the replaceable tube of the present invention, wherein the locking plates are pulled;

FIG. 3B is a side view to show the replaceable tube of the present invention wherein the locking plates are engaged with the hooks;

DETAILED DESCRIPTION OF THE PREFERRED EMBODIMENT

Figure 1:
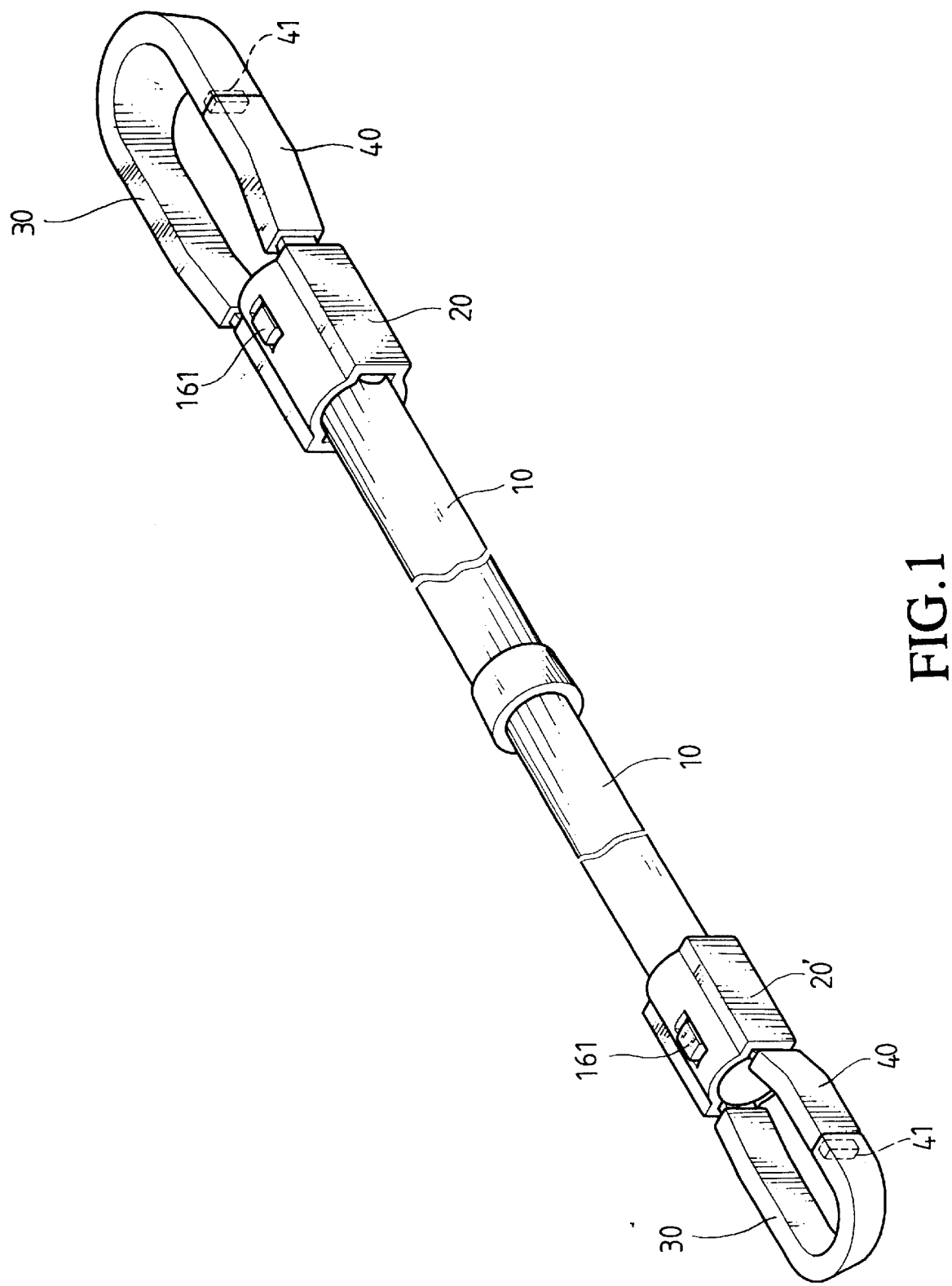
FIG. 1 is a perspective view to show the replaceable tube of the present invention.
Figure 2:
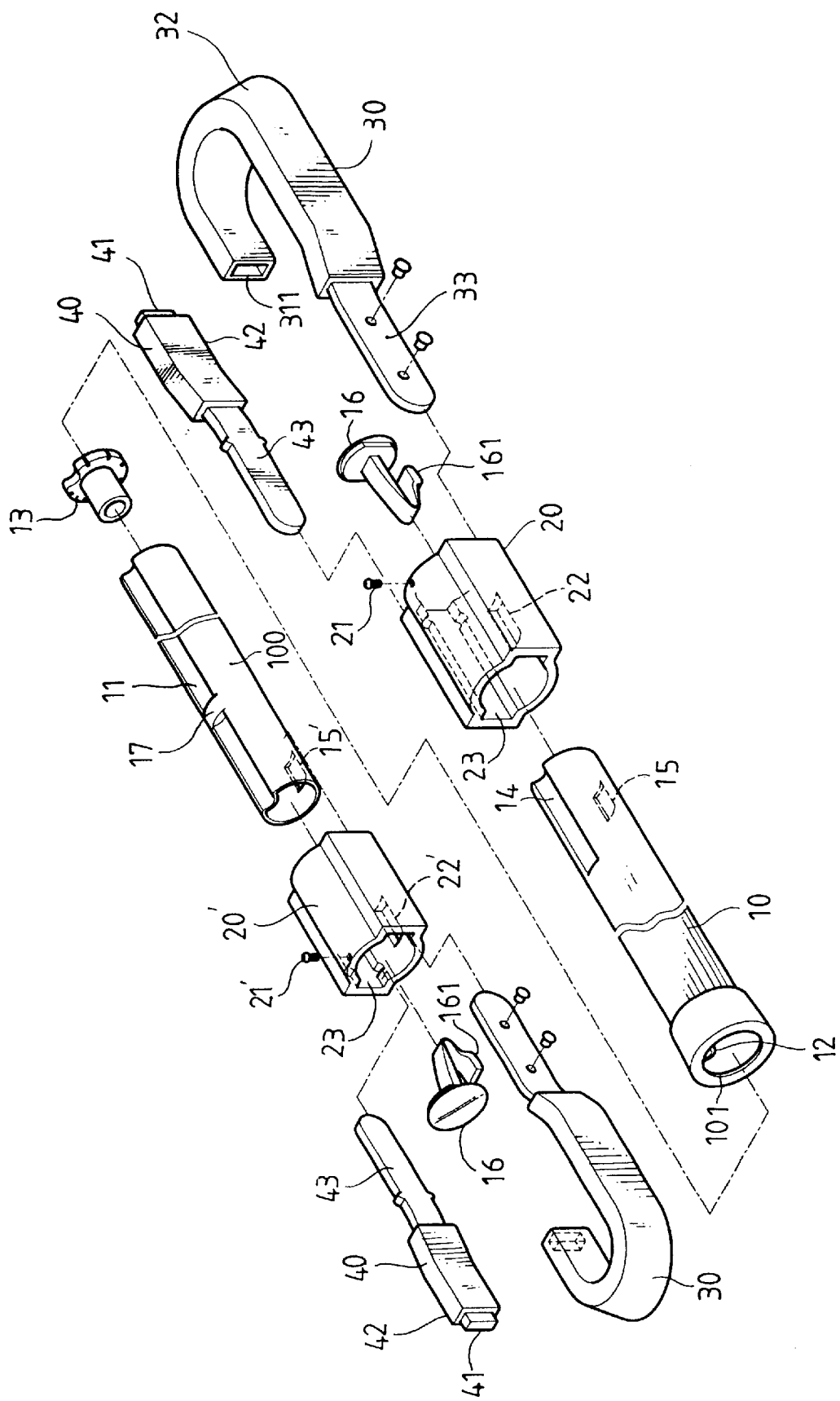
FIG. 2 is an exploded view to show the replaceable tube of the present invention.

Referring to FIGS. 1 and 2, the replaceable top tube of the present invention comprises an outer tube 10 having a first aperture 15 and a recess 14 respectively defined through a wall of a first end of the outer tube 10. A flange 101 extends radially from an inner periphery of a second end of the outer tube 10 and a protrusion 12 extends inward from the inner periphery of the outer tube 10. A first sleeve 20 is slidably mounted to the first end of the outer tube 10 and has a first hole 22 which is located in communication with the first aperture 15. A locking plate 40 has a tongue 43 which is inserted in one of two side grooves 23 defined in an inner periphery of the first sleeve 20 and is fixedly connected to the first sleeve 20. A rubber coat 42 is mounted to the locking plate 40 and an engaging portion 41 is exposed out from the rubber coat 42. A first hook 30 has a tongue 33 which is inserted in the other side groove 23 of the first sleeve 20 and is fixedly connected to the first end of the outer tube 10. A rubber coat 32 is mounted on the first hook 30 and an engaging hole 311 is defined in a distal end of the first hook 30, so that the engaging portion 41 can be engaged with the engaging hole 311 when the first sleeve 20 is not pulled. A V-shaped resilient member 16 is located in the first end of the outer tube 10 and a pushing end 161 of the resilient member 16 extends through the first aperture 15 and the first hole 22, so that when pulling the first sleeve 20, the pushing end 161 is pushed inward. The first sleeve 20 has a first stop bolt 21 extending inward from an inside thereof and so that the first stop bolt 21 contacts an inner periphery of the recess 14 to stop a movement of the first sleeve 20.

An inner tube 100 has a first end thereof retractably received in the second end of the outer tube 10 and a groove 11 is defined in an outer periphery thereof so that the protrusion 12 is engaged with the groove 11. An end member 13 is engaged with the first end of the inner tube 100 and has a flange which is engaged with the flange 101 of the outer tube 10 when the inner tube 100 is pulled to an extreme position. A second aperture 15' is defined through a wall of a second end of the inner tube 100 and a second sleeve 20' is slidably mounted to the second end of the inner tube 100 and has a second hole 22' which is located in communication with the second aperture 15'. Another locking plate 40 is fixedly connected to the second sleeve 20' by inserting a tongue 43 in one of the two side grooves 23 of the second sleeve 20', and another hook 30 is fixedly connected to the second end of the inner tube 100 by inserting a tongue 33 in the other side groove 23 of the second sleeve 20'. Both of the another locking plate 40 and the another hook 30 are connected to the second sleeve 20' and the inner tube 100 by the same way as that described regarding to the connection between the locking plate 40 and the hook 30 and the outer tube 10. The second sleeve 20' has a second stop bolt 21' extending inward from an inside thereof and a separation member 17 is located in the groove 11 of the inner tube 100 so that the second stop bolt 21' contacts the separation member 17 to stop a movement of the second sleeve 20'. The another locking plate 40 is engaged with the another first hook 30 when the second sleeve 20' is not pulled.

Figure 4:
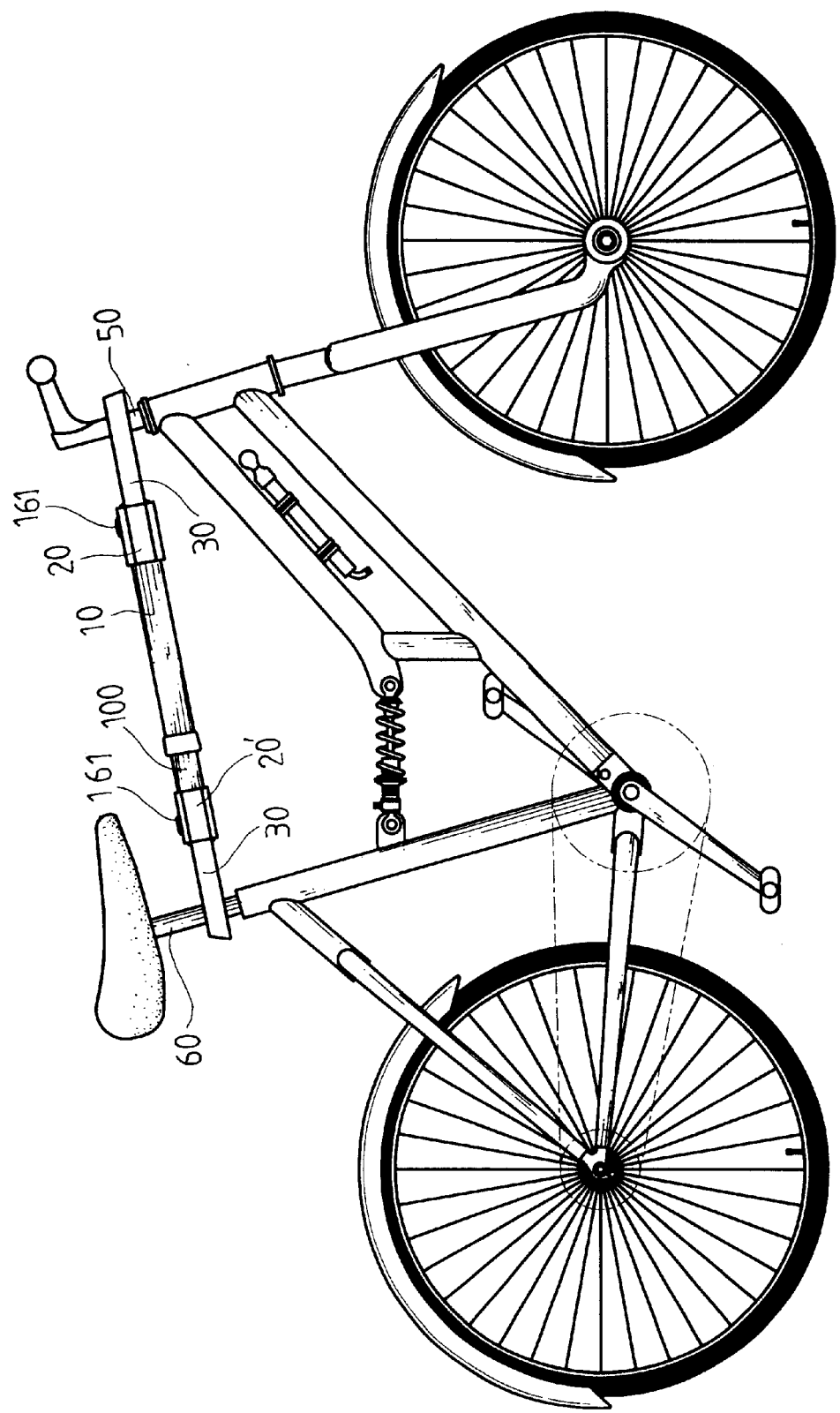
FIG. 4 is a side view to show the replaceable tube of the present invention is connected to a bicycle.
Figure 5:
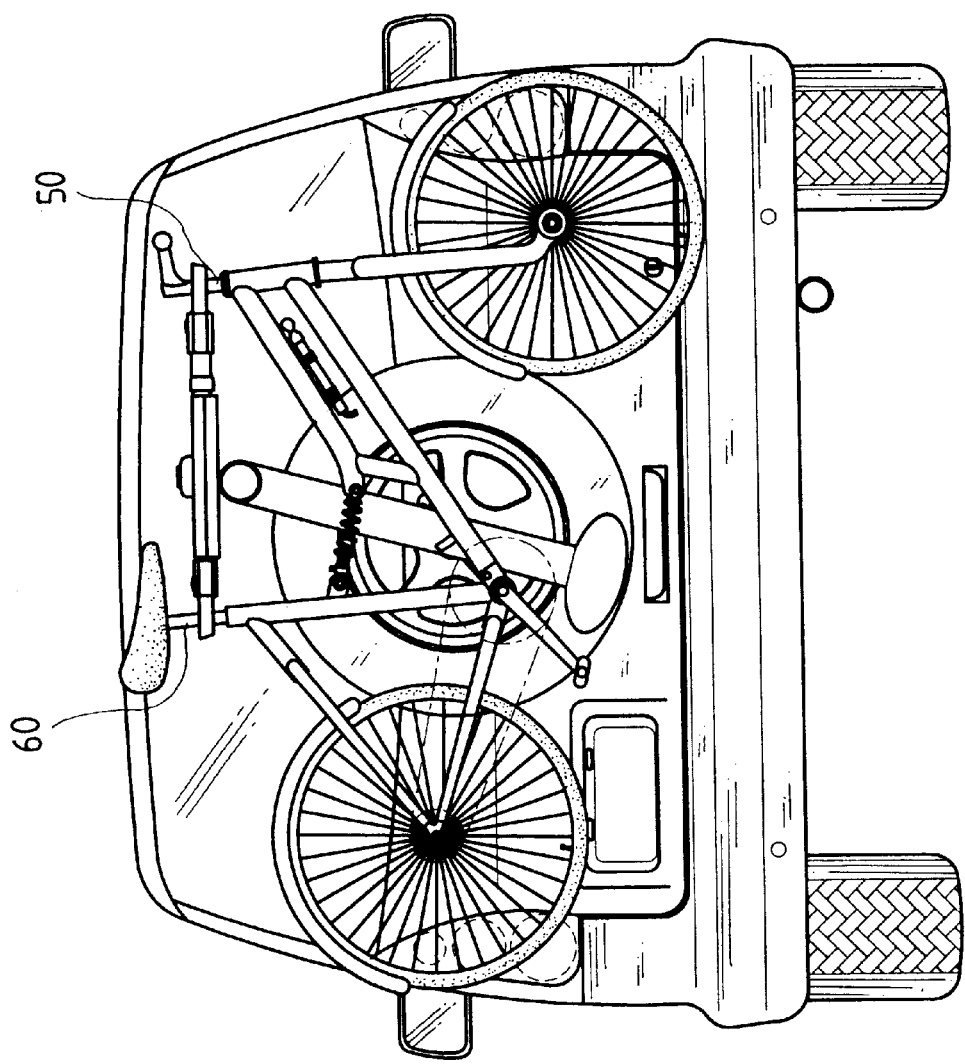
FIG. 5 is an illustrative view to show that the bicycle with the replaceable tube of the present invention is carried on a carrier of a car.
Figure 6:
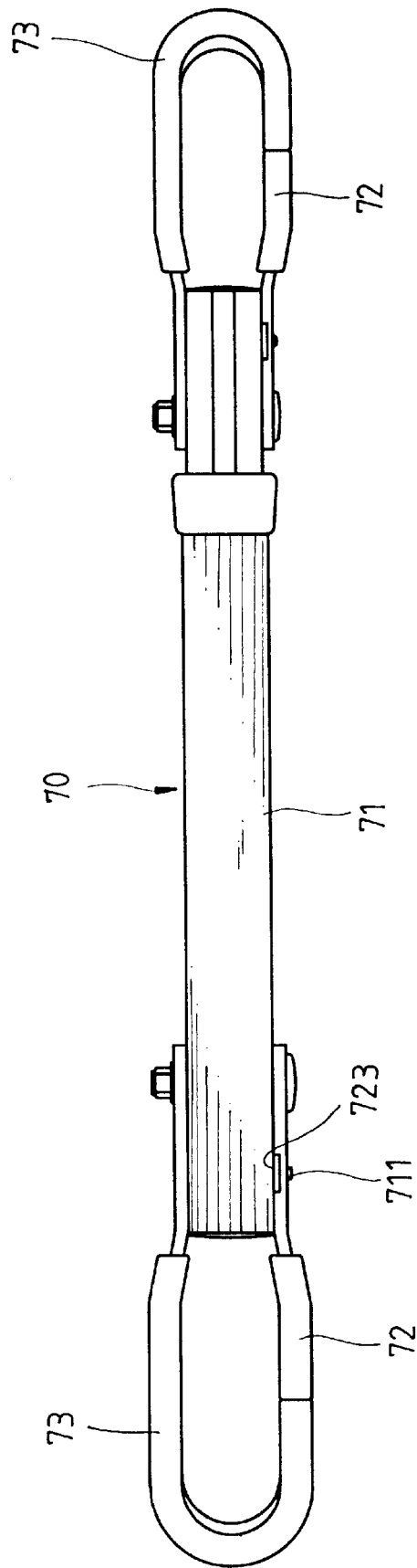
FIG. 6 is a side view to show a conventional replaceable tube.
Figure 7:
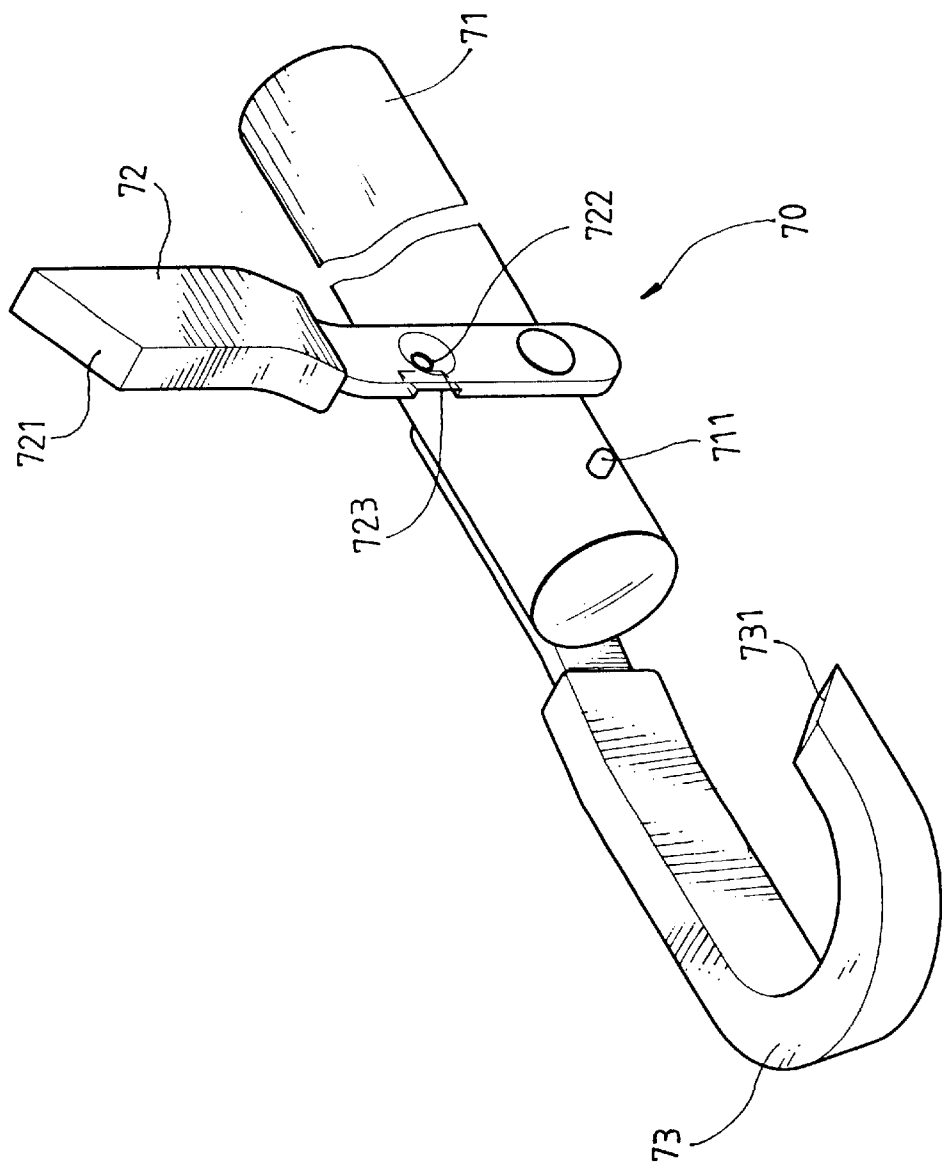
FIG. 7 is a perspective view to show the hook of the conventional replaceable tube is opened.
Figure 8:
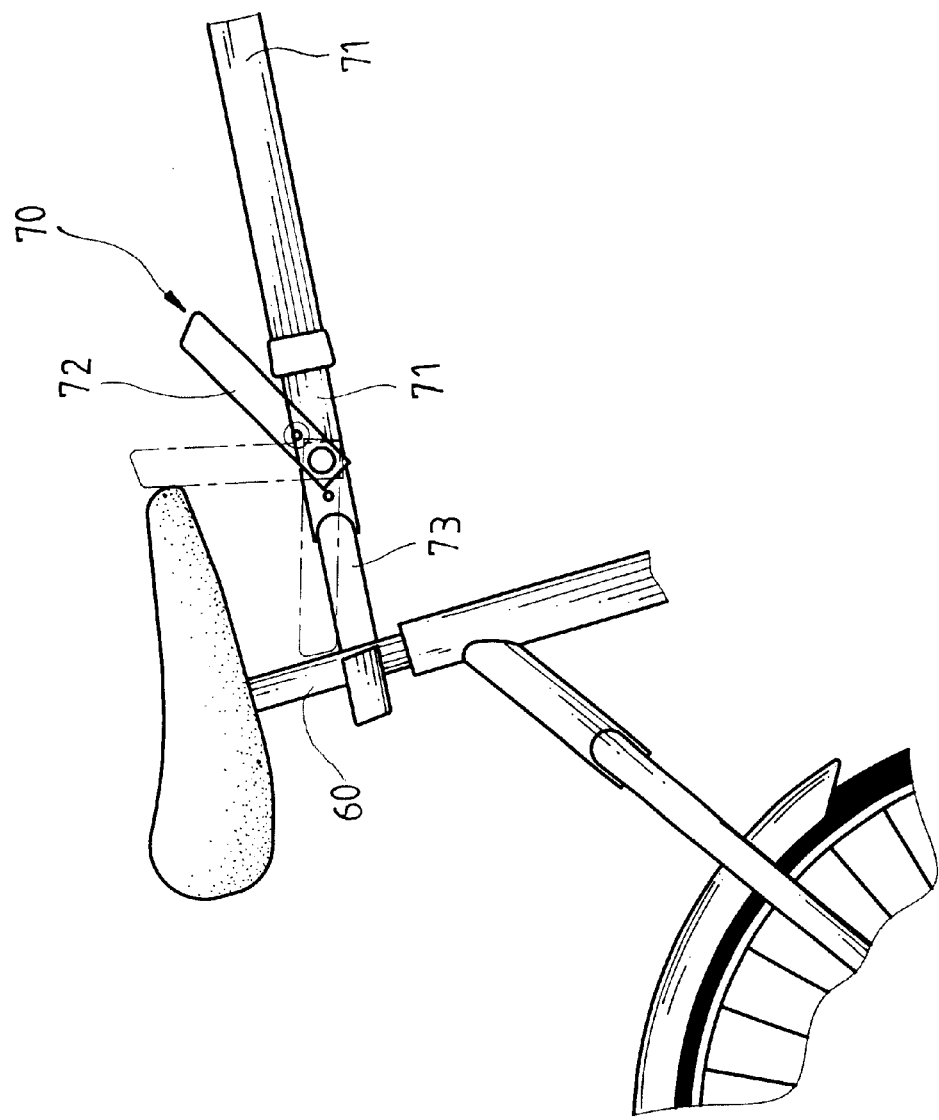
FIG. 8 is an illustrative view to show the conventional replaceable tube is used to hook a seat post.

Referring to FIGS. 3A, 3B and 4, when pulling the first sleeve 20 and the second sleeve 20', the two locking plates 40 are disengaged from the two hooks 30 so as to respectively hook the seat post 60 and the handlebar stem 50. The bicycle with the replaceable top tube is then able to be carried with a bicycle carrier on a car.

The way of disengaging the locking plates 40 from the hooks 30 is to pull the sleeves 20 20' along the outer tube 10 so that it is easily to operate. Furthermore, there are no objects of the bicycle located between the two hooks so that the operation of the two sleeves 20, 20' will not interfere with the bicycle parts.

While we have shown and described the embodiment in accordance with the present invention, it should be clear to those skilled in the art that further embodiments may be made without departing from the scope of the present invention.

What is claimed is:

1. A replaceable top tube, comprising:

an outer tube having a first aperture defined through a wall of a first end of said outer tube, a first sleeve slidably mounted to said first end of said outer tube and having a first hole which is located in communication with said first aperture, a locking plate fixedly connected to said first sleeve and a first hook fixedly connected to said first end of said outer tube, said locking plate engaged with said first hook when said first sleeve is not pulled;

a resilient member located in said first end of said outer tube and a pushing end of said resilient member extending through said first aperture and said first hole, and an inner tube having a first end thereof retractably received in a second end of said outer tube and a second aperture defined through a wall of a second end of said inner tube, a second sleeve slidably mounted to said second end of said inner tube and having a second hole which is located in communication with said second aperture, another locking plate fixedly connected to said second sleeve and another hook fixedly connected to said second end of said inner tube, said another locking plate engaged with said another hook when said second sleeve is not pulled.

2. The replaceable top tube as claimed in claim 1, wherein said outer tube has a protrusion extending inward from an inner periphery thereof and said inner tube has a groove defined in an outer periphery thereof, said protrusion engaged with said groove.

3. The replaceable top tube as claimed in claim 1, wherein said first sleeve has a first stop bolt extending into said first sleeve and a recess is defined in said first end of said outer tube so that said first stop bolt contacts an inner periphery of said recess to stop a movement of said first sleeve.

4. The replaceable top tube as claimed in claim 1 wherein said second sleeve has a second stop bolt extending into said second sleeve and a separation member is located in said groove of said inner tube so that said second stop bolt contacts said separation member to stop a movement of said second sleeve.

5. The replaceable top tube as claimed in claim 1 wherein each of said first hook and said another hook has an engaging hole defined in a distal end thereof, each of said locking plate and said another locking plate has an engaging portion extending therefrom which is engaged with said respective engaging hole.

6. The replaceable top tube as claimed in claim 1 further comprising two side grooves defined in an inner periphery of said first sleeve so that said first hook and said locking plate are respectively received in said two side grooves.

7. The replaceable top tube as claimed in claim 1 further comprising two side grooves defined in an inner periphery of said second sleeve so that said another hook and said another locking plate are respectively received in said two side grooves.

* * * * *